United States Patent
Frankowski

[11] Patent Number: 5,800,643
[45] Date of Patent: Sep. 1, 1998

[54] PNEUMATIC INNER TIRE

[75] Inventor: Richard Frankowski, Mobile, Ala.

[73] Assignee: Inner Tire Corporation, Mobile, Ala.

[21] Appl. No.: 638,342

[22] Filed: Apr. 26, 1996

[51] Int. Cl.[6] .................................................. B60C 17/01
[52] U.S. Cl. .......................... 152/156; 152/285; 152/288; 152/518
[58] Field of Search ..................... 152/156, 166, 152/285, 286, 287, 288, 261, 516, 518, 520, 247, 248

[56] References Cited

U.S. PATENT DOCUMENTS

| 572,738 | 12/1896 | Wilde | 152/288 |
|---|---|---|---|
| 574,015 | 12/1896 | Woodhouse . | |
| 580,480 | 4/1897 | Bassford . | |
| 603,268 | 5/1898 | Forsyth | 152/287 |
| 1,033,513 | 7/1912 | Aebli . | |
| 1,100,712 | 6/1914 | Calcutt | 152/286 |
| 1,120,348 | 12/1914 | Walters et al. | 152/285 |
| 1,123,466 | 1/1915 | Bailey | 152/156 |
| 1,213,557 | 1/1917 | Trotter . | |
| 1,252,921 | 1/1918 | Millar . | |
| 1,273,887 | 7/1918 | Lindemann | 152/285 |
| 1,405,888 | 2/1922 | Bailey | 152/288 |
| 1,413,872 | 4/1922 | Perry . | |
| 1,856,983 | 5/1932 | Blazquez | 152/288 |
| 4,121,640 | 10/1978 | Henning et al. | 152/518 |
| 4,428,411 | 1/1984 | Markow et al. . | |
| 4,579,160 | 4/1986 | Hardingham . | |
| 5,246,050 | 9/1993 | Stucker et al. | 152/518 |

FOREIGN PATENT DOCUMENTS

| 3942997 | 7/1990 | Germany | 152/518 |
|---|---|---|---|
| 12123 | 7/1914 | United Kingdom | 152/156 |

OTHER PUBLICATIONS

Hutchinson, SNC Defense and Security Division, Safety Roller Brochure.

Primary Examiner—Geoffrey L. Knable
Attorney, Agent, or Firm—Pravel, Hewitt, Kimball & Krieger

[57] ABSTRACT

Helical spring loop structures (inner tires) reduce vehicle accidents when tire failure occurs, reduce tire heat build-up and tread wear simultaneously. The structure, having an ability to cope with a vehicle's failed tire while in motion, provides a safer driving environment. The structures preferably are made of steel oil tempered wire, ASTM A-229 or equal, covered with rubber tubing and assembled to form a loop which can be inflated. The wire provides structural stability and the rubber tubing provides cushioning, especially when inflated.

19 Claims, 2 Drawing Sheets

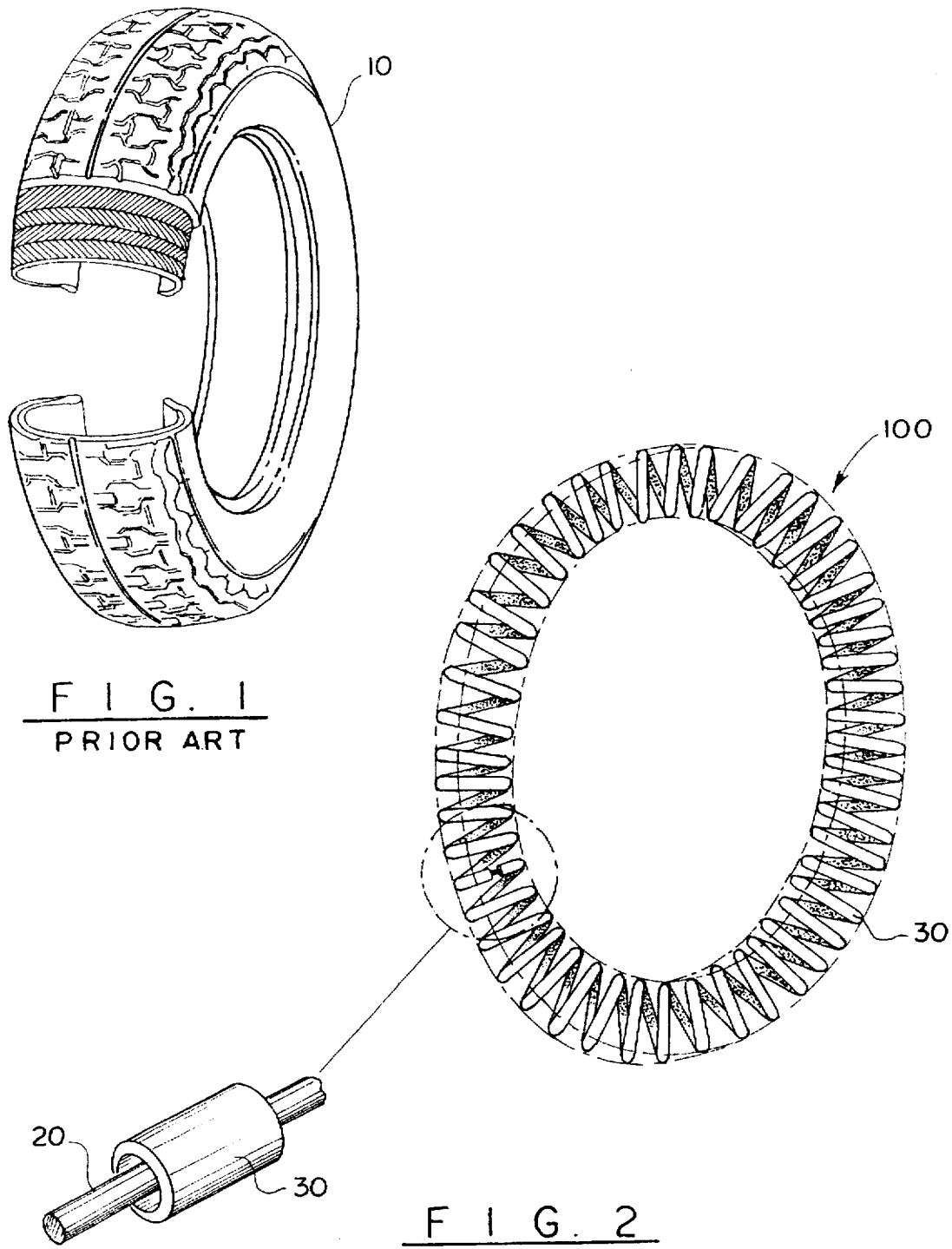

U.S. Patent     Sep. 1, 1998     Sheet 2 of 2     5,800,643
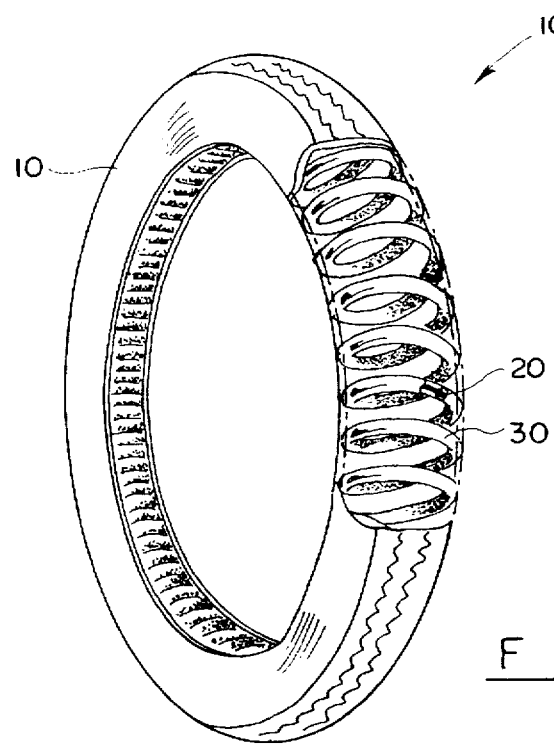
F I G. 3
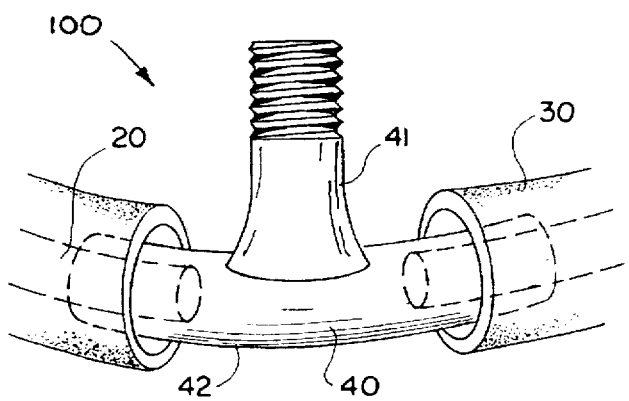
F I G. 4
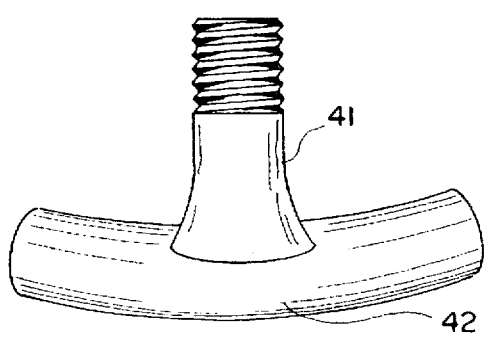
F I G. 5
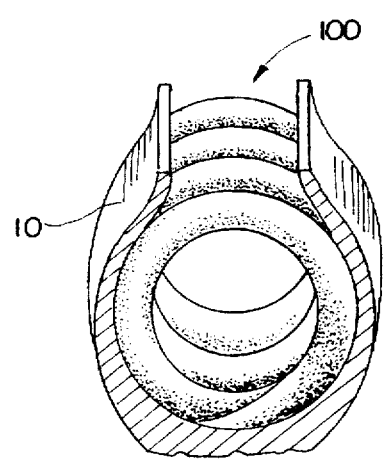
F I G. 6

PNEUMATIC INNER TIRE

SPECIFICATION

Disclosure document number 359,522, filed 11 Aug. 1994, is incorporated herein by reference.

BACKGROUND OF THE INVENTION

1. Field of the Invention

The present invention relates to pneumatic tubeless tires for vehicles, and to the ability to cope with a failed tire while in motion. The invention more particularly relates to a pneumatic helical spring inner tire which forms a loop that, when inserted inside a tire, provides load support, shock wave absorption and better control in adverse driving condition simultaneously. The helical spring includes a metal core for structural support and an inflatable rubber tubing to provide cushioning.

2. General Background

A vehicle tire's condition is fundamental to the rider's safety. In addition, it provides a wide range of performances, i.e.: wheel cover, load support, shock wave absorption and others. A new tire can meet these requirements, but as a tire gets used and has less rubber tread, it becomes more vulnerable to failure, which for years has been accepted as natural to its use.

It has been found that about 50% of motorcycle tire failure are caused by punctures, the balance - by fatigue. The inability to carry a spare tire and to change it as needed, continues to make the driving environment risky.

It is believed that many accidents, including fatalities, are caused by tire failure. Information about vehicle accidents can be found in the National Data Book (Statistical Abstract) published by U.S. Department of Commerce in 1993 and in Research Dynamics of Vehicle Tires, Vol. 5, by Andrew J. White (1973).

Over the years, numerous developments have been made in the use of safety helmet, air bags, tire sealant compounds, etc. The later prior art are disclosed, for example in U.S. Pat. Nos. 4,426,486; 4,743,497; 4,816,101 and 4,919,183. However, these composites are limited by a puncture size, tire temperature, the tread thickness, and speed of travel.

Paracell discloses a safety-roller device made of plastic. The structure, however, does not provide shock wave absorption and the cost is prohibitive.

Bearing in mind the safety problems and deficiencies in the prior art and long felt needs, it is therefore an object of the present invention to provide a pneumatic inner tire structure that when inserted inside a conventional, pneumatic-tubeless tire has improved vehicle control and reduced accidents when tire failure occurs while in motion. This pneumatic inner tire structure includes a metal core, rubber tubing enclosing the metal core, and a fill valve for inflating the rubber tubing.

It is another object of the present invention to provide a helical spring loop structure which meets the aforestated objects, yet which is relatively inexpensive to manufacture and easy to install.

No single unified theory exists for describing the area of contact of a tire with a roadway. Most of the reasons for this lie in the complexity of the tire construction and the road condition. However, it has been found that the contact area is an ellipse.

The loaded vehicle, free rolling tire footprint deflection varies, but based on information, a 14 inch tire normally deflects less than one inch vertically. To that end, it is a further object of the present invention to provide a helical spring loop structure (an inner tire) that will assist when a tire loses some of its pressure and increases vertical deflection.

Information about tire deflection can be found in Mechanics of Pneumatics Book, published by U. S. Department of Transportation in 1981.

Unless specified otherwise, when the term "vehicle" is used herein, it refers to any vehicle and equipment that uses pneumatic tubeless tires, i.e. airplane, automobile, motorcycle, truck, trailer, farm equipment, construction equipment, etc.

All publications mentioned herein are hereby incorporated by reference.

SUMMARY OF THE PRESENT INVENTION

The above and other objects, which will be apparent to those skilled in the art, are achieved in the present invention which is directed to a better vehicle control and accident reduction when tire failure occurs while in motion.

Accordingly, it is an object of the present invention to provide a specifically designed helical spring loop structure (an inner tire) that will implement the above mentioned improvements.

In accordance with this invention, these and other objects and advantages are achieved by inserting a spring loop structure inside a conventional, tubeless tire. The spring loop structure includes a metal core, rubber tubing enclosing the metal core, and a fill valve for inflating the rubber tubing.

The present invention preferably comprises apparatus including a pneumatic inner tire structure primarily intended for use in a vehicle pneumatic-tubeless tire as a reinforcing improvement when the tire fails while in motion, comprising an inflatable rubber tubing; and a high strength metal helical coil reinforcing the rubber tubing, wherein the structure has an outer diameter smaller than the inner diameter of the tire, and the structure has an inner diameter larger than the smallest outer diameter of the rim on which the tire is placed. There is preferably also a valve for filling the rubber tubing. The rubber tubing is preferably high-pressure tubing. The apparatus preferably comprises the tire and the rim as well. The high strength metal helical coil can comprises a round cross-section, steel music wire, ASTM A-228 or ASTM A-229.

The rubber tubing preferably has a diameter of ⅛" to ½". The high strength metal helical coil preferably comprises a round cross-section, steel wire, having a diameter of from about 0.125" to about 0.250", and more preferably about 0.200".

The present invention also comprises a tire assembly comprising a conventional pneumatic tire inflated with compressed air, a wheel with a rim, a pneumatic inner tire, inflated with compressed air, inserted inside the tire, for providing load support, shock wave absorption, and vehicle control in the event of a puncture or a blow-out of the conventional pneumatic tire.

The present invention, because it will help to reduce vehicle accidents due to tire failures, it should also reduce the insurance premium rates. Thus, the present invention is advantageous both in that provides a tire with improved characteristics and in that it will provide a safer driving environment.

BRIEF DESCRIPTION OF THE DRAWINGS

For a further understanding of the nature and objects of the present invention, reference should be had to the following detailed descriptions taken in conjunction with the accompanying drawings, in which like parts are given like reference numbers, and wherein:

FIG. 1 is a perspective view, partially in section, showing a conventional, pneumatic-tubeless tire;

FIG. 2 is a perspective view showing a pneumatic inner tire structure of the present invention;

FIG. 3 is a perspective view, partially in section, showing the pneumatic inner tire structure inserted inside a conventional pneumatic-tubeless tire;

FIG. 4 is a detail showing the valve and the tubing;

FIG. 5 is a detail showing the valve; and

FIG. 6 is a cut-way view showing how the structure of the present fits in a conventional tubeless tire.

DETAILED DESCRIPTION OF THE PREFERRED EMBODIMENT

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Turning to FIG. 1, there is shown a pneumatic-tubeless tire 10 of conventional design without the pneumatic inner tire structure, which is the prior art.

Turning to FIG. 2, there is shown a pneumatic inner tire structure 100 of the present invention, including a wire core 20, a rubber tubing 30, and a fill valve 40.

Turning to FIG. 3, there is shown the pneumatic inner tire structure 100 of the present invention inserted in a conventional pneumatic-tubeless tire 10.

The wire core 20 can be made of, for example, a round cross section steel music wire, ASTM A-228, or an oil-tempered steel wire, ASTM A-229. Other similar wires could be used.

The vehicle pneumatic-tubeless tire pneumatic inner tire structure of this invention preferably comprises a round cross-section, steel music wire, ASTM A228, A229, or equivalent material, covered with a rubber tubing, and assembled to form a loop. The spring coil is preferably in the form of a helical configuration. It is a unique and significant reinforcing improvement which when inserted inside a tire, provides the following advantages when tire failure occurs: improved vehicle control and reduced accidents, reduced heat build-up, reduced tire wear and should reduce insurance premium rates simultaneously.

The conventional, pneumatic-tubeless tire of the prior art is indicated as 10 in the view of FIG. 1.

The helical spring loop structure 20 comprises a plurality of spring coils that form a loop.

Finally, the pneumatic inner tire structure 100 inserted inside a conventional, pneumatic-tubeless tire 10 is best seen in the perspective, partially sectional view of FIG. 3.

The present invention can be made by selecting a proper length of the proper size of coiled oil tempered or music quality wire 20 (for example, 0.192 inch diameter wire, wound into a coil 3 inches in diameter when used with a size 130/90/16 motorcycle tire), threading a rubber tubing 30 (such as ⅛" inch inner diameter (approximately ⅝–¾" outside diameter) MB Air Brake rubber tubing commercially available as part no. SAE J1402 from Continental Manufacturing Company, and having the following markings thereon: GY-Continental-MB Air Brake-3/8-A-SAE J1402) onto the wire, then connecting the two ends of the wire (such as by welding or with an appropriate adhesive). A fill valve 40 (comprising a valve stem 41 and a tube 42, both of which can be made of copper or brass, for example) is then joined to the two ends of the tubing in a pressure-tight manner, such as with GP Atom brand cyanoacrylate adhesive, commercially available from GP-Produkte, Göppingen, Germany, or the ends of the rubber tubing 30 can be vulcanized to join them together and secure valve 40 in place. The rubber tubing 30 can be filled with air at a pressure of, for example, from 40 psi to 80 psi (preferably about 40 psi). The tubing 30 is filled with air with a fill valve such as valve 40 before being placed in a tire, so fill valve 40 need not project through the tire (in fact, valve 40 is preferably directed inwardly so that it is in the coils of structure 20, instead of projecting outwardly). Alternatively, fill valve 40 could be omitted. In such a case, the ends of the rubber tubing 30 would be sealed together in an airtight manner, then structure 100 could be placed in a pressure vessel at a sufficient pressure for a sufficient amount of time (e.g., 80 psi for 2 hours) to fill tubing 30 with enough pressure to provide additional cushioning in the event that tire 10 deflates (rubber tubing 30 is porous enough that air under pressure can go through it—when placed in tire 10, it will soon reach the same pressure as tire 10, but will then lose it rather slowly when tire 10 loses the air rapidly, allowing a motorcycle rider to ride on tire 10 long enough to get tire 10 to a location where tire 10 can easily be repaired). Even if a fill valve 40 is provided, structure 100 could be placed in tire 10 uninflated, and it will eventually reach the same pressure as tire 10, as described above).

Tube 42 can have a diameter of, for example, ¼" to ⅜".

Although the ends of wire 20 are shown in FIG. 4 to be spaced apart, they can touch or be positioned adjacent one another. Also, the ends of tubing 30 can be notched to fit around valve fitting 41 so that the ends can meet and be joined together and optionally sealingly secured to tube 42. Otherwise, the ends of tubing 30 can simply be sealingly secured to tube 42, and not to each other.

It will thus be seen that the objects set forth above, among those made apparent from the preceding description, are efficiently attained, and since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed as invention is:

1. Apparatus including a pneumatic inner tire structure primarily intended for use in a vehicle pneumatic-tubeless tire as a reinforcing improvement when the tire fails while in motion, the tire being mounted on a rim, the tire including a first largest inner diameter, the rim including a first smallest outer diameter, the pneumatic inner tire structure comprising:
    (a) an annular helical inflatable rubber tubing;
    (b) a high strength metal helical coil reinforcing the rubber tubing;
    (c) a valve for filling the rubber tubing, wherein:
        the structure has an outer diameter smaller than the largest inner diameter of the tire; and
        the structure has an inner diameter larger than the smallest outer diameter of the rim.

2. The apparatus of claim 1, further comprising the tire and the rim.

3. The apparatus of claim 1, wherein the high strength metal helical coil comprises a found cross-section, steel music wire, ASTM A-228.

4. The apparatus of claim 1, wherein the high strength metal helical coil comprises a round cross-section, oil tempered steel wire, ASTM A-229.

5. The apparatus of claim 1, wherein the rubber tubing is high-pressure rubber tubing.

6. The apparatus of claim 1, wherein the metal helical coil is inside the inflatable rubber tubing.

7. The apparatus of claim 6, wherein the inflatable rubber tubing is threaded onto the metal helical coil.

8. Apparatus including a pneumatic inner tire structure primarily intended for use in a vehicle pneumatic-tubeless tire as a reinforcing improvement when the tire fails while in motion, the tire being mounted on a rim, the tire including a first largest inner diameter, the rim including a first smallest outer diameter, the pneumatic inner tire structure comprising:

(a) an annular helical inflatable rubber tubing;

(b) a high strength metal helical coil reinforcing the rubber tubing, wherein:

the structure has an outer diameter smaller than the largest inner diameter of the tire, the structure has an inner diameter larger than the smallest outer diameter of the rim, and the metal helical coil is inside the inflatable rubber tubing.

9. The apparatus of claim 8, further comprising the tire and the rim.

10. The apparatus of claim 8, wherein the high strength metal helical coil comprises a around cross-section, steel music wire, ASTM A-228.

11. The apparatus of claim 8, wherein the high strength metal helical coil comprises a round cross-section, oil tempered steel wire, ASTM A-229.

12. The apparatus of claim 8, wherein the rubber tubing is high-pressure rubber tubing.

13. The apparatus of claim 8, wherein the rubber tubing has a diameter of ⅛" to ½".

14. The apparatus of claim 8, wherein the high strength metal helical coil comprises a round cross-section, steel wire, having a diameter of from about 0.125" to about 0.250".

15. The apparatus of claim 8, wherein the high strength metal helical coil comprises a round cross-section, steel wire, metal helical coil comprises a round cross-section, steel wire, having a diameter of about 0.200".

16. The apparatus of claim 8, wherein the high strength metal helical coil comprises a round cross-section, steel wire, having a diameter of from 0.125" to 0.250".

17. The apparatus of claim 8, wherein the inflatable rubber tubing is threaded onto the metal helical coil.

18. A tire assembly comprising:

(a) a pneumatic-tubeless tire inflated with compressed air;

(b) a wheel with a rim, the tire being mounted on the rim, the tire including a first largest inner diameter, the rim including a first smallest outer diameter.;

(c) a pneumatic inner tire structure, inflated with compressed air, inserted inside the tire, for providing load support, shock wave absorption, and vehicle control in the event of a puncture or a blow-out of the conventional pneumatic tire, the pneumatic inner tire structure comprising:

(a) an annular helical inflatable rubber tubing;

(b) a high strength metal helical coil reinforcing the rubber tubing, wherein:

the structure has an cuter diameter smaller than the largest inner diameter of the tire;

the structure has an inner diameter larger than the smallest outer diameter of the rim; and the metal helical coil is inside the inflatable rubber tubing.

19. The apparatus of claim 18, wherein the inflatable rubber tubing is threaded onto the metal helical coil.

\* \* \* \* \*